F. GREENE.
CAMERA.
APPLICATION FILED FEB. 4, 1916.
1,251,654.
Patented Jan. 1, 1918.
3 SHEETS—SHEET 1.
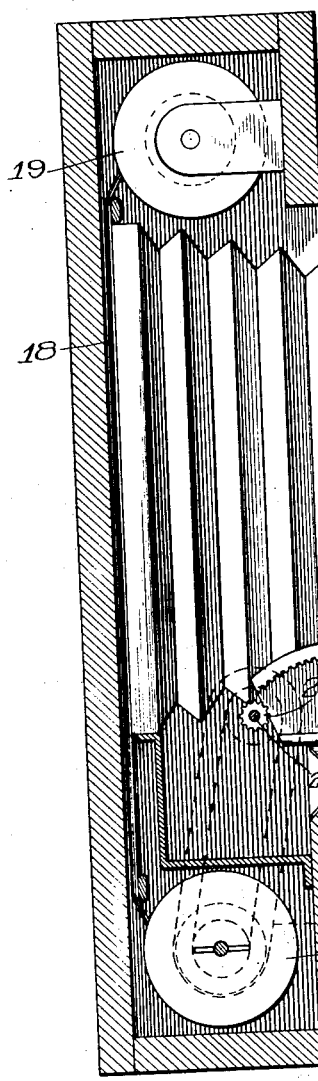
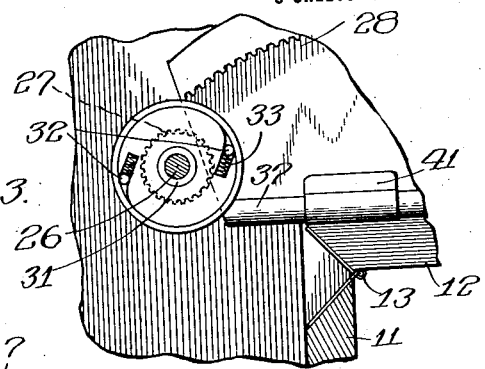
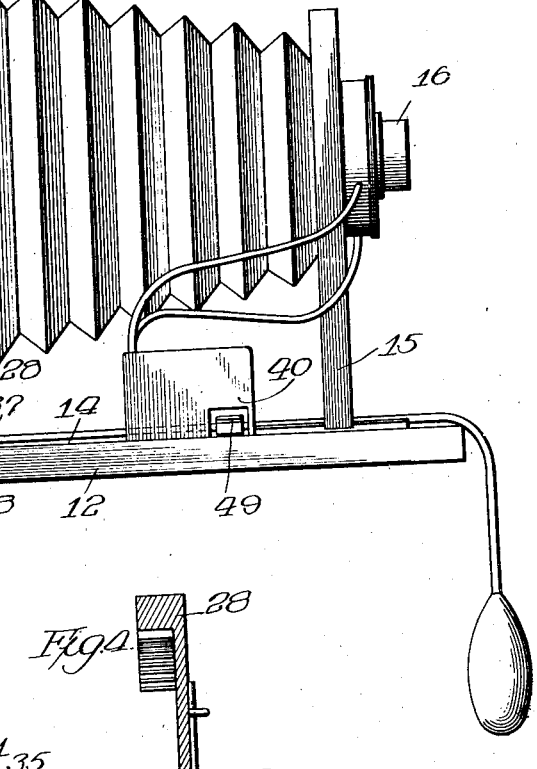
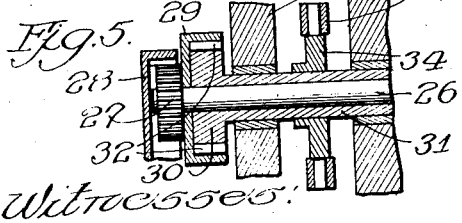
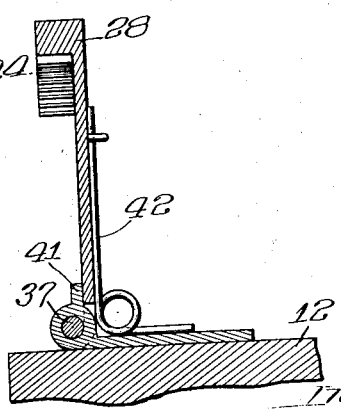
Witnesses:
Inventor.
Frank Greene
By C. C. Linthicum
Atty.

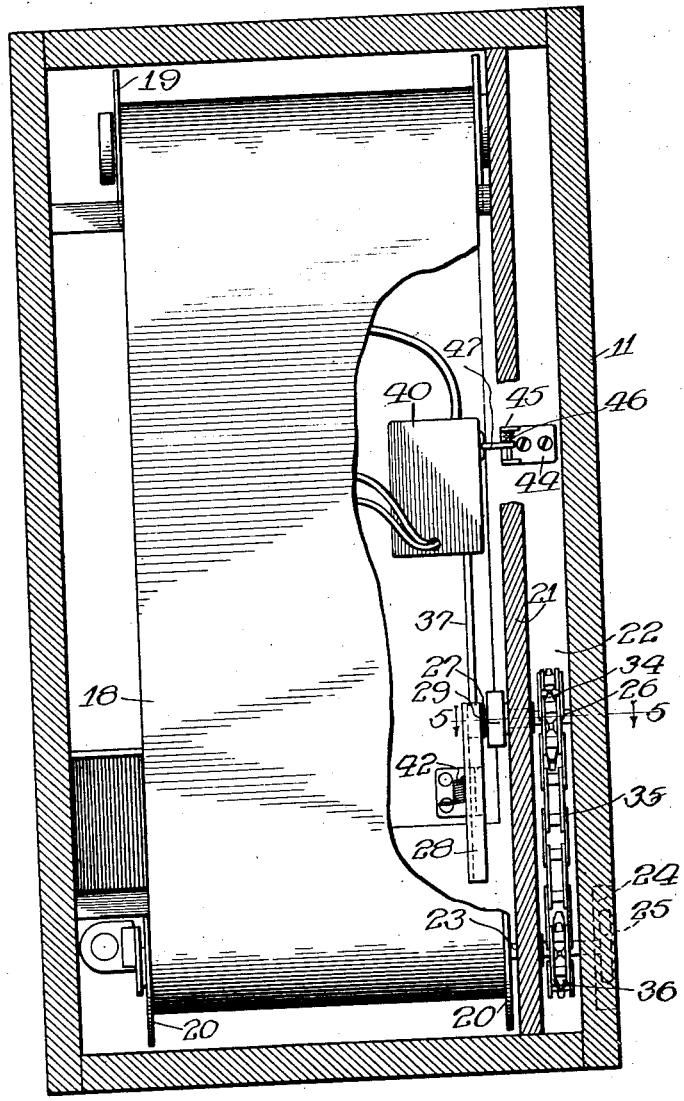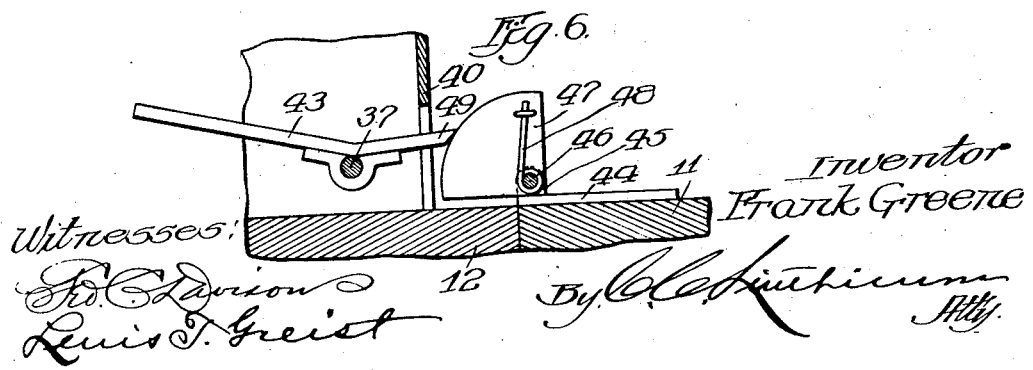

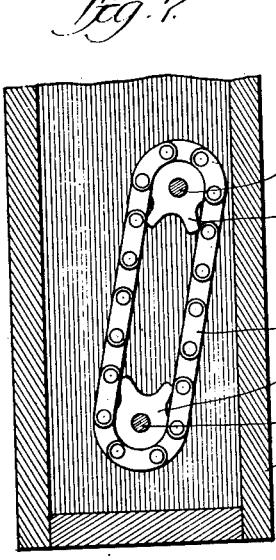
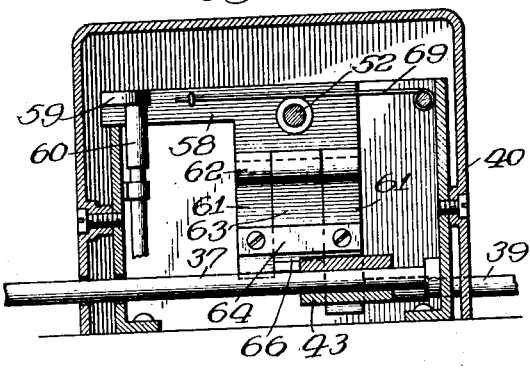
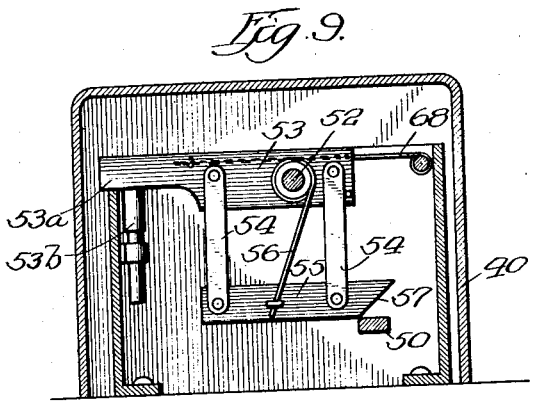
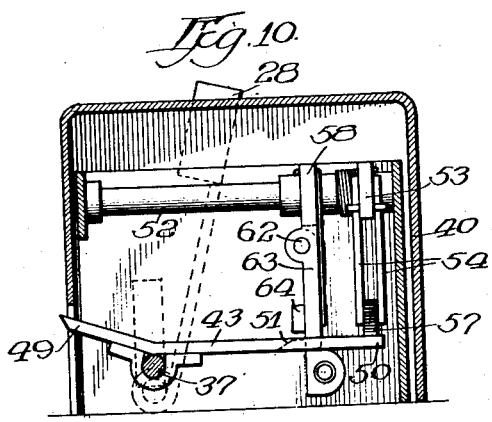
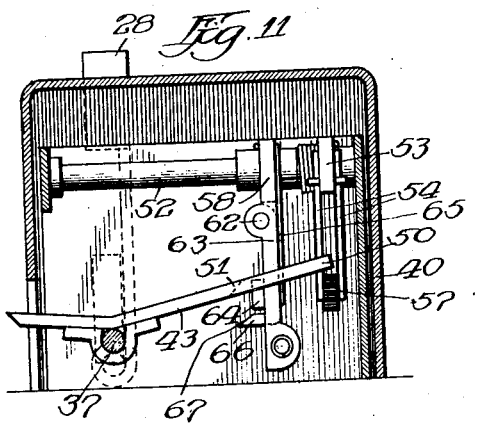

UNITED STATES PATENT OFFICE.

FRANK GREENE, OF CHICAGO, ILLINOIS.

CAMERA.

1,251,654.  Specification of Letters Patent.  Patented Jan. 1, 1918.

Application filed February 4, 1916.  Serial No. 76,076.

*To all whom it may concern:*

Be it known that I, FRANK GREENE, a citizen of the United States, residing at Chicago, in the county of Cook and State of Illinois, have invented certain new and useful Improvements in Cameras, of which the following is a specification.

The invention has for its object the provision in a photographic hand camera of the kodak type of means associated therewith whereby to automatically insure against abortive and double exposure and to do away with the necessity of mental or manual effort in connection with the adjustment of the shutter and sensitive film preparatory to the taking of a picture.

I accomplish these objects by so arranging the camera mechanism that in the act of opening or closing the camera and lowering the bed and expanding the bellows, the shutter will be set and in reversing such movements the film will be advanced to bring a fresh sensitized surface before the lens in case an exposure has been made by the operation of the shutter and if an exposure has not been made the film will not be advanced; the term "opening of the camera" being used in a generic sense as applied to the changing of the camera from an inoperative to an operative condition or vice versa.

In order that the invention may be readily understood a preferred embodiment of the same is set forth in the accompanying drawings and in the description based thereon, in which embodiment the film is advanced by the closing of the drop bed while the shutter is set by the opening of the same. Obviously, as intimated above, the actuating connections may be modified within wide range without affecting the principle of the invention as embodied therein, wherefore it is to be understood that the drawing and description are to be taken in an illustrative and not in an unnecessarily limiting sense. In the drawings:—

Figure 1 is a longitudinal vertical section through the camera at one side of the bellows;

Fig. 2 is a transverse vertical section through the camera box at the rear of the film roll, a portion of the latter being broken away;

Figs. 3 and 4 are fragmentary views showing the driving mechanism connecting the drop bed of the camera and film spool;

Fig. 5 is a fragmentary sectional view through said gearing on the line 5—5 of Fig. 2;

Fig. 6 is a detail view showing the means for actuating the mechanism upon the movement of the bed;

Fig. 7 is a sectional view showing in side elevation the connection between the film spool and its driving pinion;

Fig. 8 is a view showing in side elevation the detent mechanism for the trip and shutter release;

Fig. 9 is a view similar to Fig. 7 showing the trip engaging and shutter setting mechanism; and Figs. 10 and 11 are views showing the shutter setting and release mechanism in edge elevation in their relation to the trip mechanism in different positions of use.

The camera box is indicated at 11 as provided with a door or drop bed 12 hinged at 13 and bearing a track 14 for the lens board 15 supporting the lens 16 at the front end of the bellows 17, the inner end of which latter is secured within the camera in operative relation to the film 18 extending between the film supply and take-up spools 19 and 20. Thus far the camera is of the usual type. At one side of the film the partition 21 separates the film chamber from the edge wall of the camera leaving a narrow space 22. The axle 23 of the film take-up spool 20 is journaled within the partition 21 and extends therethrough and may be provided within the recess 24 with a finger piece 25 for manual winding although according to my invention this finger piece is unnecessary and may be dispensed with.

Also journaled within the partition 21 and the side wall 11 of the camera box is a shaft 26 having fixed upon its inner end a pinion 27 arranged to mesh with an interiorly toothed sector 28. Also fixed upon the shaft 26 and rotating with the pinion 27 is the outer member 29 of a clutch, the inner member 30 of the clutch being loosely mounted upon the shaft 26 by means of its hub 31. Upon the rotation of the outer member 29 in one direction the clutch balls 32 under the impulse of their springs 33 are caused to effect a wedging engagement between the clutch members and lock the same, while in the reverse direction of movement of the pinion 27 and the clutch member 29 the inner member 30 will remain stationary. This form of clutch is shown by way of illustration, it being obvious that a ratchet and pawl or other one-way driving coupling may be employed.

Upon the outer end of the sleeve 31 is keyed a sprocket 34 which is connected by means of the sprocket chain 35 with a sprocket 36 on the shaft 23 of the take-up spool whereby the take-up spool will be driven upon the rotation of the pinion 27 in one direction and will remain stationary when the said pinion is rotated in the reverse direction.

The sector 28 previously referred to as arranged to mesh with the pinion 27 has its center in the hinge 13 of the drop bed and upon being swung about said center as the drop bed is opened and closed furnishes driving power to the said pinion. For the purposes of the invention, it is desired that under certain conditions the sector shall mesh with and drive the pinion 27 and that under other conditions the sector shall remain out of engagement with the said pinion in order that the pinion shall normally be rotated in one direction only and that the same shall be rotated to drive the take-up spool only after an exposure has been made.

To this end the sector 28 is fixed upon a rock shaft 37 journaled at 38 on the bed of the camera adjacent its inner end, the outer end of said shaft being journaled at 39 in the wall of the housing 40 for the shutter setting and releasing mechanism. This shaft is yieldingly held with the sector 28 in vertical position against the stop 41 with its teeth in the same vertical plane as the teeth of the pinion 27 by means of a spring 42 and is adapted to be rocked against the influence of said spring by a trip 43 fixed upon the outer end of said shaft within the housing 40 in the manner following:

Upon the front wall of the camera box adjacent the opening within which fits the drop bed 12 when the camera is closed, and at a distance from the hinge 13 corresponding to the distance between said hinge and the trip 43, is fixed a plate 44 carrying upstanding ears 45 within which is journaled the shaft 46 of a trip actuating segment 47 which is yieldingly held under the influence of the spring 48 (Fig. 6) in the path of the lip 49 of the trip 43 as the camera is opened and closed. In the closing movement the lip 49 engages the lower side of the segment 47 and swings it in opposition to the spring 48 out of the path of the said lip so that the position of the trip is not affected. Immediately after the passage of the lip 49 the segment 47 resumes the position indicated in Fig. 6. When the bed is dropped in the opening of the camera the lip 49 is forced upward by the resistance of the segment 47 and thereby the trip 43 is tilted, rocking the shaft 37 against the tension of the spring 42 and swinging the sector 28 to a position inclined to the vertical with its teeth out of the vertical plane of the pinion 27 so that as the camera bed is dropped to its open position the pinion 27 is not rotated.

The trip 43 has upon the opposite side of the shaft 37 from the lip 49 two other lips 50 and 51 which respectively serve as the rock shaft is operated to set the shutter and to retain the trip and shaft in the rocked position against the influence of the spring 42 in the manner following:

Within the housing 40 (Fig. 9) upon the shaft 52 is mounted a shutter setting lever 53. The extreme end 53ª is adapted to receive the impulse communicated in the usual manner by pneumatic or other suitable means from the hand of the operator as indicated at 53ᵇ. Suspended from the lever 53 by means of parallel links 54 is a bar 55 which is yieldingly pressed to the right as shown in said Fig. 9 by means of the spring 56. This bar has its end beveled at 57 and so disposed as to be operatively engaged by the lip 50 of the trip 43.

Within the housing 40 is also mounted upon the shaft 52 alongside the shutter setting lever 53 a shutter releasing lever 58 (Fig. 8) the end 59 of which is arranged to be acted upon by the pneumatic or other releasing mechanism indicated at 60. The lever 58 has depending portions 61 forming a yoke within which is hingedly suspended at 62 a detent 63 which is normally pressed toward the front, as shown in said figure, against the retaining bar 64 by means of the spring 65. The lower end of the detent 63 is angularly bent and projects at 66 beneath the retaining bar 64 and has an upper beveled surface 67 arranged to be engaged by the correspondingly beveled lip 51 of the trip 43 (Fig. 11).

The setting lever 53 and the release lever 58 are respectively yieldingly held in the position shown by means of springs 68 and 69 with their free ends in operative relation to the pneumatic operating means 60.

As the shaft 37 is rocked upon the dropping of the camera bed the trip 43 by means of the descending lip 50 engages the flat upper surface of the end of the bar 55 and thereby moves the lever 53 in opposition to its spring 68 setting the shutter independently of the pneumatic device 60. The tilting of the lever 53 permits the lip 50 to clear the bar 55 and assume a position (Fig. 9) below said bar and adjacent the beveled end thereof. At the same time the beveled lip 51 engages the beveled surface 67 of the detent 66 and pushes the same to the rear (Fig. 11) in opposition to the spring 65, the lip 51 snapping beneath the projecting end 66 of the detent and holding the trip with its lip 50 in the position just described, beneath the beveled surface 57 of the bar 55. The shutter of the camera is now set ready for an exposure and an unexposed portion of the sensitive film is presented to the lens at the rear of the bellows.

If, now, the operator decides for any reason not to make an exposure the lifting of the bed and the closing of the camera will not affect the film for the reason that the sector 28 will not engage with the pinion 27, being held out of the plane thereof by means of the detent 66 engaging the lip 51 of the trip, and the closing of the camera will leave the parts in undisturbed relation ready for use upon a future occasion.

If, on the other hand, an exposure be made by the rocking of the release lever 58 under the influence of the pneumatic release 60 the detent 66 will clear the lip 51 and permit the lips 51 and 50 of the trip 43 to rise under the influence of the spring 42. The lip 50 will now act upon the beveled surface 57 of the bar 55 and swing the same to the left against the influence of the spring 56 without affecting the position of the setting lever 53. The tilting of the trip 43 will permit the shaft 37 to rock, bringing the sector 28 into the plane of the pinion 27. Thereafter upon the lifting of the bed and the closing of the camera the pinion 27 will be driven by the sector 28 and its motion will be transmitted through the clutch, the chain and sprocket to the take-up spool 20, the number of teeth in the sector having such relation to those of the pinion 27 that the movement of the bed through its angle of 90 degrees will be exactly sufficient to take up the exposed portion of the film and bring into proper position a fresh surface for the next exposure.

It will thus be observed that the exposed film is automatically taken up and a fresh surface exposed upon the closing of the camera after an exposure is made and that the winding of the film is not effected by the closing of the camera where the exposure has not been made; also that upon the opening of the camera the shutter is automatically set for the making of an exposure, whereby mistakes are guarded against on the part of an inexperienced operator or in case of haste or agitation which would otherwise cause an abortive or a double exposure.

I claim:

1. In a camera, the combination with the film spool, the lens, and the shutter, of means for winding the spool of film to present a fresh sensitized surface to the lens, and a driving connection between the film winding means and the door of the camera, said film winding means including normally uncoupled elements, and means actuated by the shutter in the act of making an exposure to couple the said elements of the driving connection whereby the film winding means will be actuated automatically by the door movement of the camera only after the making of an exposure.

2. In a camera, the combination with the film spool, the lens, and the shutter, of film winding mechanism including a normally uncoupled train, and a connection between the film winding mechanism and the shutter whereby the movements of the shutter in the act of making an exposure will couple the train and render the said winding mechanism operative.

3. In a camera, the combination with the film spool, the lens, and the shutter, of means automatically actuated by the opening and the closing of the camera to set the shutter for an exposure, spool winding mechanism arranged to be actuated by the movements of the camera parts incident to use of the camera and including normally uncoupled elements, and means actuated by the shutter in making the exposure to couple said elements whereby to vitalize the winding mechanism to present a fresh sensitized surface to the lens.

4. In a camera, the combination with the film spool, the lens, and the shutter, of a shaft, a drive connection between the shaft and spool, a pinion on the shaft, a toothed sector, a rock shaft carrying the sector mounted to oscillate about its center in the opening and closing of the camera to bring the same into and out of mesh with the pinion, a trip arm carried by the shaft, means to rock the shaft out of mesh with the pinion, a detent included in the shutter mechanism and engaging the shaft to hold it in the rocked position, said detent arranged to release the shaft as the exposure is made, and means to restore the shaft to bring the sector into mesh with the pinion.

5. In a camera, the combination with the film spool, the lens, and the shutter, of a shaft, a drive connection between the shaft and spool, a pinion on the shaft, a toothed sector mounted on the camera bed to oscillate about its center in the opening and closing of the camera, a rock shaft carrying the sector to bring the same into and out of mesh with the pinion, spring means to rock the shaft in one direction, a trip arm carried by the shaft, means to engage the arm as the camera is prepared for an exposure whereby to rock the sector in opposition to the spring, a detent included in the shutter mechanism and engaging the trip to hold the shaft in rocked position, said detent arranged to release the trip as the exposure is made and permit the spring means to restore the sector to its original position.

6. In a camera, the combination with the film spool, the lens, and the shutter, of a shaft, a drive connection between the shaft and spool, a pinion on the shaft, a toothed sector mounted on the camera bed to oscillate about its center in the opening and closing of the camera, a rock shaft carrying the sector to bring the same into and out of mesh with the pinion, spring means to yieldingly hold the sector in mesh with the pinion, a trip arm carried by the shaft, means to engage the arm as the camera is opened to rock the sector in opposition to the spring out of mesh with the pinion, a detent included in the shutter mechanism and engaging the trip to hold the sector out of mesh with the pinion, said detent arranged to release the trip as the exposure is made and permit the spring means to restore the sector into mesh with the pinion.

7. In a camera, the combination with the film spool, the lens, and the shutter, of a shaft, a drive connection between the shaft and spool, a pinion on the shaft, a toothed sector mounted on the camera bed to oscillate about its center in the opening and closing of the camera, a rock shaft carrying the sector to bring the same into and out of mesh with the pinion, spring means to yieldingly hold the sector in mesh with the pinion, a trip arm carried by the shaft, means to engage the arm as the camera is opened to rock the sector in opposition to the spring out of mesh with the pinion and by means of the arm to set the shutter, a detent included in the shutter mechanism and engaging the trip to hold the sector out of mesh with the pinion, said detent arranged to release the trip as the exposure is made and permit the spring means to restore the sector into mesh with the pinion.

8. In a camera, the combination with the film spool, the lens, and the shutter, of a shaft, a drive connection between the shaft and spool, a pinion on the shaft, a toothed sector mounted on the camera bed to oscillate about its center in the opening and closing of the camera, a rock shaft carrying the sector to bring the same into and out of mesh with the pinion, spring means to yieldingly hold the sector in mesh with the pinion, a trip arm carried by the shaft, means to engage the arm as the camera is opened to rock the sector in opposition to the spring out of mesh with the pinion, a lip on the arm adapted to engage and set the shutter as the shaft is rocked in the opening of the camera, a second lip formed on the trip, a detent connected with the shutter release and adapted to engage the last named lip as the exposure is made whereby to permit the spring means to restore the sector to its original position in mesh with the pinion.

9. In a camera, the combination with a film spool, the lens, and the shutter, of a shaft, a pinion on the shaft, a one-way drive connection between the pinion and spool, a toothed sector mounted on the camera bed to oscillate about its center in the opening and closing of the camera, a rock shaft carrying the sector to bring the same into and out of mesh with the pinion, spring means to rock the shaft in one direction to swing the sector into meshing position with the pinion, a trip arm carried by the shaft and provided with three lips, means to engage the first lip as the camera is opened to rock the sector in opposition with the spring out of mesh with the pinion, shutter setting mechanism comprising a setting lever, a bar swinging therefrom and having an upper flat surface and a lower beveled surface, the flat surface of the bar arranged in the path of the second lip whereby the tilting of the trip will operate the lever to set the shutter and the lower beveled surface of the bar arranged in the set position of the shutter to overlie the second lip and to permit the bar to be pushed out of the way to allow the return of the lip, a shutter releasing mechanism comprising a release lever, a detent adapted to be pushed out of the way by the third lip as the shaft is rocked in the setting of the shutter and to snap over the third lip to hold the trip in said position, the release lever operated by the making of the exposure to cause the detent to release the third lip whereby to permit the spring means to restore the sector to its original position in mesh with the pinion after an exposure is made.

Signed at Chicago, Illinois, this seventh day of April, 1915.

FRANK GREENE.

Witnesses:
LEWIS T. GREIST,
MARION G. ELWELL.